(12) United States Patent
Ambs

(10) Patent No.: US 6,288,976 B1
(45) Date of Patent: Sep. 11, 2001

(54) SEISMIC GEOPHONE COUPLING SYSTEM

(76) Inventor: Loran D. Ambs, 5443 Windrush, Fulshear, TX (US) 77441

(*) Notice: Subject to any disclaimer, the term of this patent is extended or adjusted under 35 U.S.C. 154(b) by 0 days.

(21) Appl. No.: 09/584,437

(22) Filed: May 31, 2000

(51) Int. Cl.⁷ ........................................... G01V 1/16
(52) U.S. Cl. .................. 367/178; 181/122; 181/401
(58) Field of Search ........................... 181/401, 402, 181/122; 367/188, 140, 178

(56) References Cited

U.S. PATENT DOCUMENTS

| | | | |
|---|---|---|---|
| 4,359,131 | * 11/1982 | Martin | 181/401 |
| 5,010,531 | * 4/1991 | McNeel | 367/188 |
| 5,130,954 | * 7/1992 | Fussell | 367/188 |
| 5,365,491 | * 11/1994 | Sullivan et al. | 367/188 |

* cited by examiner

*Primary Examiner*—Ian J. Lobo
(74) *Attorney, Agent, or Firm*—Alan J. Atkinson

(57) ABSTRACT

An apparatus and a method for anchoring a seismic geophone to soil. The apparatus comprises a base having a base section for engagement with the geophone. The base also has an anchor end attachable to the soil to restrict movement of the geophone after said base section is engaged with the geophone and after said anchor end is attached to the soil. A latch can detachably secure the base section to the geophone or to a seismic cable attached to the geophone, and the base can comprise a biodegradable material. The method of the invention attaches the base anchor end to the soil so that the base section engages the geophone to restrict movement of the geophone from the desired location relative to the soil.

15 Claims, 1 Drawing Sheet

SEISMIC GEOPHONE COUPLING SYSTEM

BACKGROUND OF THE INVENTION

The present invention relates to the field of geophones for collecting seismic data. More particularly, the invention relates to an improved apparatus and method for attaching geophones to soil.

Seismic exploration techniques examine subsurface geologic formations by sending a signal into the geologic formations and by sensing seismic waves reflected from the geologic formations. The seismic waves are detected with geophones connected by a leader wire to create a geophone string. Each geophone generates signals transmitted to a recording station through conductors in the leader wire or through wireless transmission techniques. The signals and positions of each geophone are processed to generate profiles of the subsurface geologic formations.

In marine seismic operations, geophone strings are towed behind a seismic vessel to record signals reflected from the subsurface geologic formations or are positioned as bottom cables on the soil underlying the water. Onshore, geophone strings are positioned in an array on the soil surface to record the reflected signals. As used herein, the term "soil" can comprise a variety of materials including dirt, sand, hardpan, rock, or submerged sediments.

One approach uses specialized tools to place geophones in the soil. U.S. Pat. No. 4,838,379 to Maxwell (1989) disclosed a tool for orienting a geophone in a selected direction. U.S. Pat. No. 5,007,031 to Erich (1991) disclosed a planting tool for placing a geophone in a shallow hole.

Other approaches emphasize the connection between a geophone case and the seismic cable. U.S. Pat. No. 3,931,453 to Hall (1976) disclosed a geophone case attached to a seismic cable wherein the cable was run through two 180 degree bends to strengthen the connection between the case and cable. U.S. Pat. No. 4,470,134 to McNeel (1984) disclosed a geophone case attached to a cable with inner and outer connections.

Certain geophone designs have spikes attached to a geophone case for providing engagement with soil. A representative example of a land based geophone is described in U.S. Pat. No. 5,010,531 to McNeel which showed ground coupling spikes attached to the geophone for stabilizing the geophone and for improving the contact between the geophone and the ground. These ground coupling spikes were installed by workers during the placement of the geophone strings and reduced instability of unanchored geophones. U.S. Pat. No. 5,124,956 to Rice et al. (1992) disclosed a geophone case having spikes with weighted tips and larger diameter bow springs. U.S. Pat. No. 5,130,954 to Fussell (1992) disclosed a geophone case having a spike on the case lower end for penetrating the soil.

Other systems have focused on retrieving seismic geophones after the geophones have been installed on the soil underlying water. U.S. Pat. No. 5,189,642 to Donoho (1993) disclosed an elaborate system for using a buoy to retrieve a geophone. U.S. Pat. No. 5,978,317 to Whitener (1999) disclosed a system for burying geophones in storage containers and for recovering such geophones at a later date.

Ocean bottom systems rely upon the weight of the geophones and cable to couple the geophones with to the soil. Gravity coupling of the geophones in certain marine environments does not provide good data quality.

Minaturization of geophone components has reduced geophone sizes and sometimes permits the integration of geophones into the geophone strings. Techniques for fixing the location of such geophones has not been developed, and is needed to prevent geophone movement after the location of each geophone is established. Accordingly, a need exists for an improved system for anchoring geophones to soil.

SUMMARY OF THE INVENTION

The present invention provides an apparatus and a method for anchoring a seismic geophone to soil. The apparatus comprises a base having a base section for engagement with the geophone. The base also has an anchor end attachable to the soil to restrict movement of the geophone after said base section is engaged with the geophone and after said anchor end is attached to the soil. In different embodiments of the invention, a latch can detachably secure the base section to the geophone or to a seismic cable attached to the geophone. The base can comprise a biodegradable material and can be U-shaped or J-shaped in different embodiments.

The method of the invention comprises the steps of placing the geophone at a desired location relative to the soil, of orienting the geophone in a preferred direction, of positioning a base proximate to the geophone, and of attaching the base anchor end to the soil so that the base section engages the geophone to restrict movement of the geophone from the desired location relative to the soil.

DESCRIPTION OF THE PREFERRED EMBODIMENTS

Figure 1:
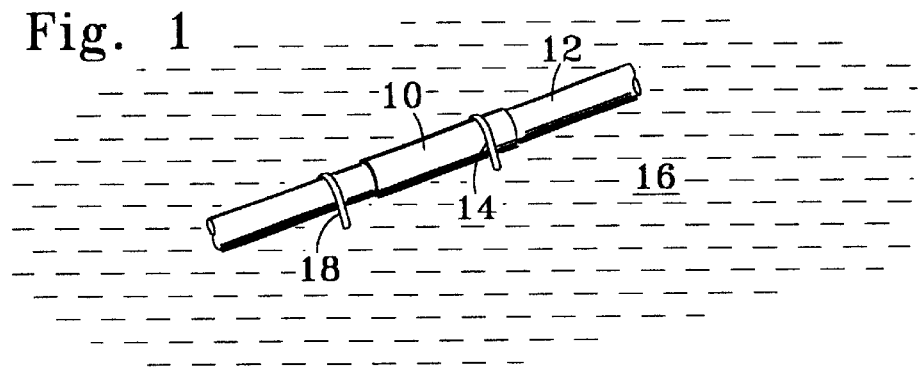
FIG. 1 illustrates a base engaged with soil to retain a geophone and seismic cable in a fixed location.

The invention provides a system for retaining seismic geophones in a selected position relative to soil on land or under water. FIG. 1 illustrates geophone 10 (which can contain x, y, and z components) integrated within seismic cable 12. Base 14 is engaged with soil 16 to retain geophone 10 in a selected location relative to soil 16. Such retention restricts movement of geophone 10 due to environmental forces such as wind or ocean currents, and due to further manipulation of the seismic cable as such cable is laid in a selected seismic array. Although base 14 is illustrated in engagement with geophone 10, such base can also be engaged with seismic cable 12 as illustrated by base 18. In such embodiment, base 18 is preferably located in a position proximate to geophone 10.

Figure 2:
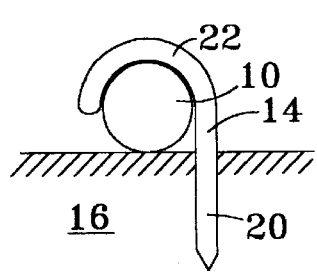
FIG. 2 illustrates a J-shaped base.

FIG. 2 illustrates the engagement of base 14 with soil 16. Base 14 comprises anchor end 20 attachable to soil 16 and also includes base section 22 for engagement with geophone 10. As illustrated in FIG. 2, base section 22 is shaped to contain geophone 10 without placing uneven stress on geophone 10. Base section 22 can be curved to closely fit the circular cross-section of geophone 10 or can be shaped in other configurations to conform with other geophone case shapes in the radial or axial dimensions of geophone 10. Base 14 is illustrated in a J-shape wherein anchor end 20 is attached to soil 16 until base section 22 contacts and contains geophone 10.

Figure 3:
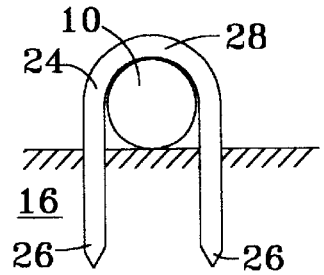
FIG. 3 illustrates a U-shaped base.

FIG. 3 illustrates another embodiment of the invention wherein base 24 is U-shaped and has two anchor ends 26 for attachment to soil 16 and one base section 28 for engagement with geophone 10. In this embodiment of the invention, alignment of geophone 10 with base 24 is secured even though anchor ends 26 do not fully penetrate soil 16. This embodiment is particularly useful in survey areas wherein the composition and hardness of soil 16 varies, and facilitates use of one base design throughout the survey area.

Figure 4:
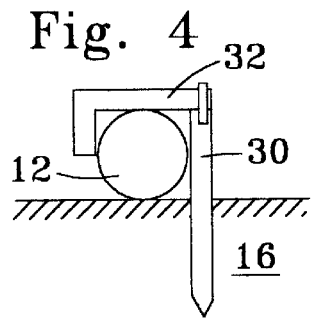
FIG. 4 illustrates a base having a moveable latch.

FIG. 4 illustrates another embodiment of the invention wherein base 30 is attached to soil 16 and moveable latch 32 is attached to base 30. Base 30 can be attached to soil 16 and seismic cable 12 can be placed adjacent base 30. Latch 32 can then be moved to engage geophone 10 or seismic cable 12 to prevent further movement thereof After the seismic survey for such line is complete, latch 32 can be moved to release seismic cable 12 from engagement with base 30.

Figure 5:
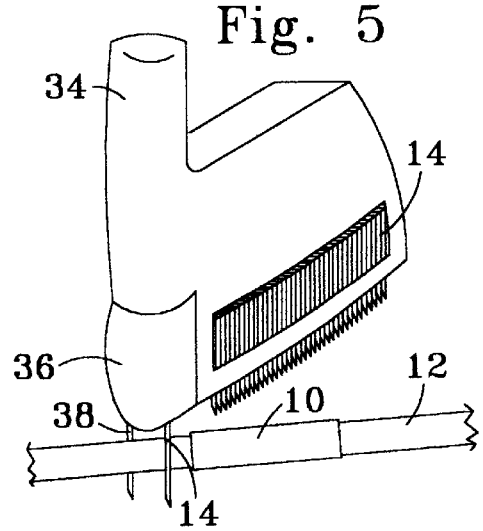
FIG. 5 illustrates a tool for selectively installing and retrieving one or more bases.

FIG. 5 illustrates tool 34 for facilitating attachment and retraction of base 14. Tool 34 can store multiple bases 14 within an interior compartment and can operate drive head 36 to selectively shoot, staple, or otherwise move base 14 into engagement with soil 16. In one embodiment of the invention, tool 34 can carry a roll of wire or other material supply 36 which is internally shaped by tool 34 and from which individual bases 14 are severed from such wire roll as each base 14 is moved into engagement with soil 16. Tool 34 can operate lifting hook 38 to selectively remove base 14 from attachment with soil 16. In another embodiment of the invention, base 14 can be formed with a biodegradable material left in soil 16 after geophone 10 is removed from engagement with base 14.

The method of the invention comprises the steps of placing geophone 10 at a desired location relative to soil 16, of orienting geophone 10 in a preferred direction, of positioning base 14 proximate to geophone 10, and of attaching base anchor end 20 to soil 16 so that base section 22 engages geophone 10 or seismic cable 12 to restrict movement of geophone 10 and seismic cable 12 from the desired location relative to soil 16. As previously discussed, a base can cooperate with latch 32 to facilitate attachment and detachment of geophone 10 from the base, a tool such as tool 34 can facilitate storage, deployment and retrieval of one or more bases, and tool 34 can also shape the base prior to deployment.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for anchoring a seismic geophone to soil, comprising:

a base having a base section for engagement with the geophone and further having an anchor end attachable to the soil to restrict movement of the geophone after said base section is engaged with the geophone and after said anchor end is attached to the soil; and a tool for moving said base anchor end into attachment with the soil, wherein said tool is configured to store a plurality of bases before the bases are attached to the soil.

2. An apparatus as recited in claim 1, wherein said tool includes a mechanism for removing said base anchor end from attachment with the soil.

3. An apparatus as recited in claim 1, wherein said base comprises a biodegradable material.

4. An apparatus as recited in claim 1, wherein said base section is curved to conform to an exterior shape of the seismic geophone for engagement with the geophone and further has an anchor end attachable to the soil to restrict movement of the geophone and seismic cable after said anchor end is attached to the soil.

5. An apparatus as recited in claim 1, wherein said base section is shaped for engagement with the seismic cable at a location proximate to the seismic geophone.

6. An apparatus as recited in claim 1, wherein said base section has a latch for selectively engaging the geophone.

7. An apparatus as recited in claim 1, wherein said base is substantially J-shaped.

8. An apparatus as recited in claim 1, wherein said base is substantially U-shaped and said anchor end comprises two ends attachable to the soil.

9. An apparatus as recited in claim 1, further comprising a latch attached to said base section for selectively engaging the geophone.

10. A method for anchoring a seismic geophone to soil, comprising the steps of:

placing the geophone at a desired location relative to the soil;

positioning a base proximate to the geophone, wherein said base has a base section for engagement with the geophone and further has an anchor end attachable to the soil; and attaching said base anchor end to the soil so that said base section engages the geophone to restrict movement of the geophone from the desired location relative to the soil.

11. A method as recited in claim 10, further comprising the step of attaching said base anchor end to the soil so that said base section engages a seismic cable at a location proximate to the geophone.

12. A method as recited in claim 10, further comprising the step of operating a latch attached to said base section to engage the geophone.

13. A method as recited in claim 12, further comprising the step of operating said latch to disengage the geophone from said base section.

14. A method as recited in claim 10, further comprising the step of operating a tool containing multiple bases to selectively discharge each base from said tool and into engagement with the soil.

15. A method as recited in claim 10, further comprising the step of forming said base from a material supply contained by a base dispensing tool.

* * * * *